United States Patent [19]

Danford

[11] 4,194,230
[45] Mar. 18, 1980

[54] HAZARDOUS VOLTAGE PROTECTION CIRCUITRY

[75] Inventor: Glenn S. Danford, Oklahoma City, Okla.

[73] Assignee: Southwest Utilities, Inc., Oklahoma City, Okla.

[21] Appl. No.: 941,068

[22] Filed: Sep. 11, 1978

[51] Int. Cl.$^2$ .................. H02H 3/04; H02H 7/26
[52] U.S. Cl. ..................... 361/1; 179/78 A;
307/129; 328/138; 361/113; 361/182
[58] Field of Search .................. 361/1, 113, 182;
179/78 A; 307/233 R, 129; 328/138, 140

[56] References Cited
U.S. PATENT DOCUMENTS

| | | | |
|---|---|---|---|
| 1,377,573 | 5/1921 | Fortescue | 361/113 |
| 3,940,698 | 2/1976 | Itoh | 328/138 X |

OTHER PUBLICATIONS

"A Circuit for Protecting Transister Amplifiers from Extraneous Currents," Khrennikova, Telecommunication & Radio Eng., vol. 27, No. 2, pp. 36-39, 2/1973.

Primary Examiner—Harry E. Moose, Jr.
Attorney, Agent, or Firm—Robert M. Hessin

[57] ABSTRACT

A safety circuit for protective operation at the interface between certain customer premises telephone installations and the external telephone distribution lines. The protection circuit includes a means for discriminating any voltages of sufficient magnitude having a frequency at or near 60 Hz., and upon such detection, a reactance means is responsive to open the connection between the premises telephone installation and the external telephone distribution line.

14 Claims, 5 Drawing Figures

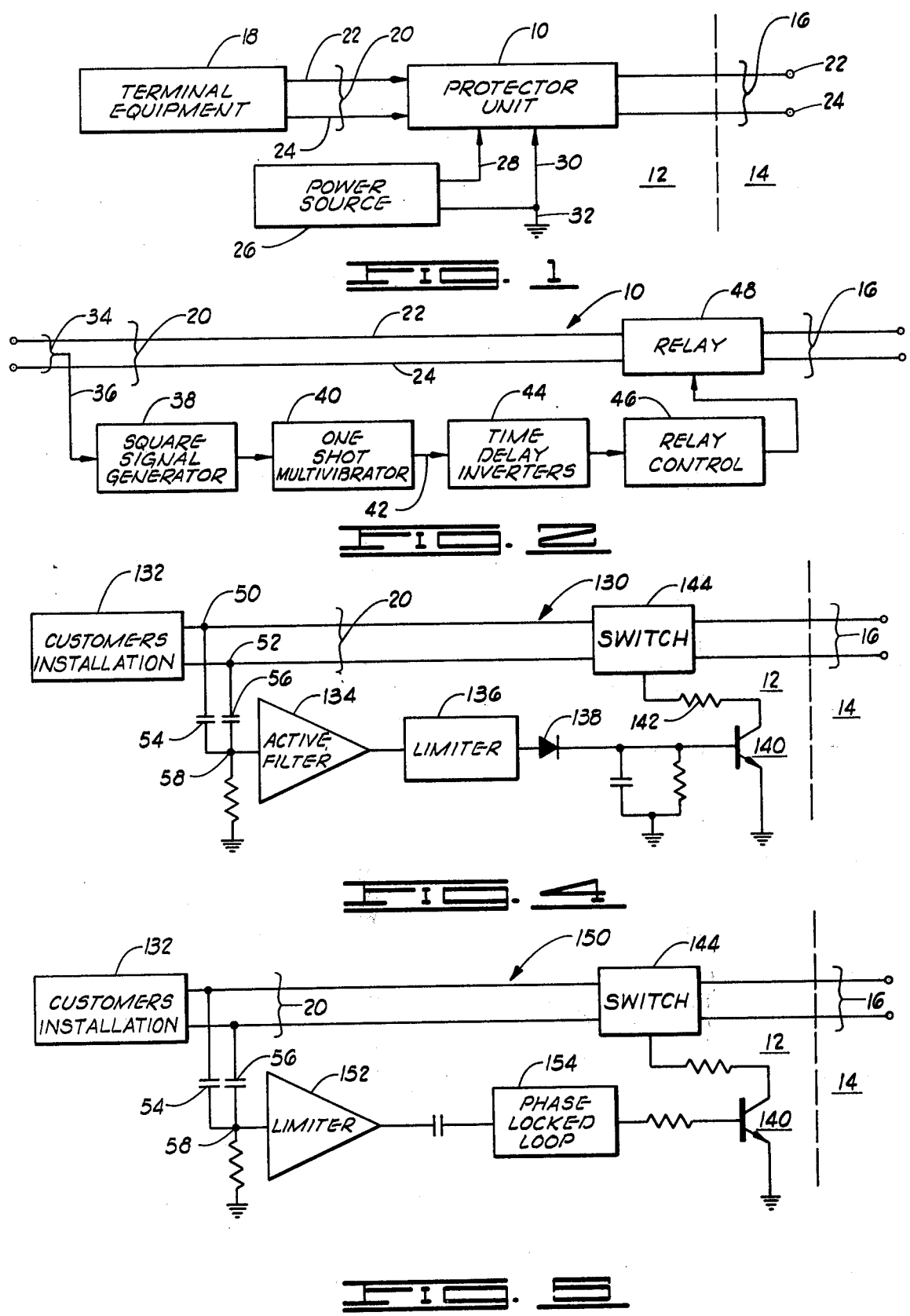

HAZARDOUS VOLTAGE PROTECTION CIRCUITRY

BACKGROUND OF THE INVENTION

1. Field of the Invention

The invention relates generally to telephone protective circuits and, more particularly, but not by way of limitation, it relates to a frequency responsive interface circuit for avoiding the possibility that any hazardous voltage may get from a premises telephone installation onto the external telephone distribution lines.

2. Description of the Prior Art

No similar protective circuits or other circuit intended for the related protective function is known to Applicant. The particular protective funtcion is necessitated by the recent promulgation of protective circuit rules as set forth by the Federal Communications Commission in recent enactments, viz. The FCC Rules and Regulations, Part 68, which relate generally to business type telephone installations. Thus, this invention is born of exigencies arising in response to the newly adopted regulation and no prior circuit types having similar function are known.

SUMMARY OF THE INVENTION

The present invention contemplates a hazardous voltage protection circuit for interface between a private premises telephone installation and the external or company-owned telephone distribution lines. All telephone lines in the United States have a static 48 volt D-C potential between the tip and ring connections, and these connections are used to detect ringing conditions, used for rotary dialing information, and used to provide talk battery to the handset. The connection within the distribution line will also include some form of ringing voltage to alert the customer that there is an incoming call. This ringing voltage may vary from 40–150 volts rms at from 20 to 28 Hz. The hazardous voltage protection circuitry of the present invention must determine whether any high voltage present on tip and ring is "hazardous" or is a bona fide "ringing voltage" from the central office, and the present invention performs this function by discriminating by frequency between 60 Hz. voltage and 20 to 30 Hz. ringing voltage.

Thus, the protection circuit is interface between the premises telephone installation and the telephone external distribution line to continually sense voltage thereon, whereupon discrimination means responds to voltage at frequencies at or near 60 Hz. to generate a control signal for energization of a reactance means which, in turn, controls a switching means to break the distribution line connection. In the preferred form of the invention, the discrimination means performs a dual function of discriminating both as to hazard voltage amplitude, and discriminating such amplitudes as a function of hazard voltage frequencies.

Therefore, it is an object of the present invention to provide a device that will open the connection to the external telephone distribution line upon sensing of any hazardous voltage thereon.

It is also an object of the present invention to provide a protection circuit for telephone installation that is simple and inexpensive yet highly reliable in operation.

It is further an object of this invention to provide a frequency responsive circuit device that will always open the external line connection upon sensing the presence of a hazardous voltage.

It is also an object of the present invention to provide a device that is in full compliance with newly promulgated FCC regulations regarding hazard voltage protective circuitry.

Finally, it is an object of the present invention to provide a circuit device having maximum detection and control capabilities relative to most forms of hazardous voltage that might possibly find connection to the external telephone distribution line from within a customer's premises.

Other objects and advantages of the invention will be evident from the following detailed description when read in conjunction with the accompanying drawings which illustrate the invention.

BRIEF DESCRIPTION OF THE DRAWINGS

FIG. 1 is a block diagram representative of a general form of customer premise protective circuit in accordance with the present invention;

FIG. 2 is a block diagram of the preferred form of the invention;

FIG. 4 is a block diagram of an alternative form of protective circuit; and

FIG. 5 is a block diagram of yet another alternative form of protective circuit encompassed by the present invention.

DETAILED DESCRIPTION OF THE PREFERRED EMBODIMENT

Figure 3:
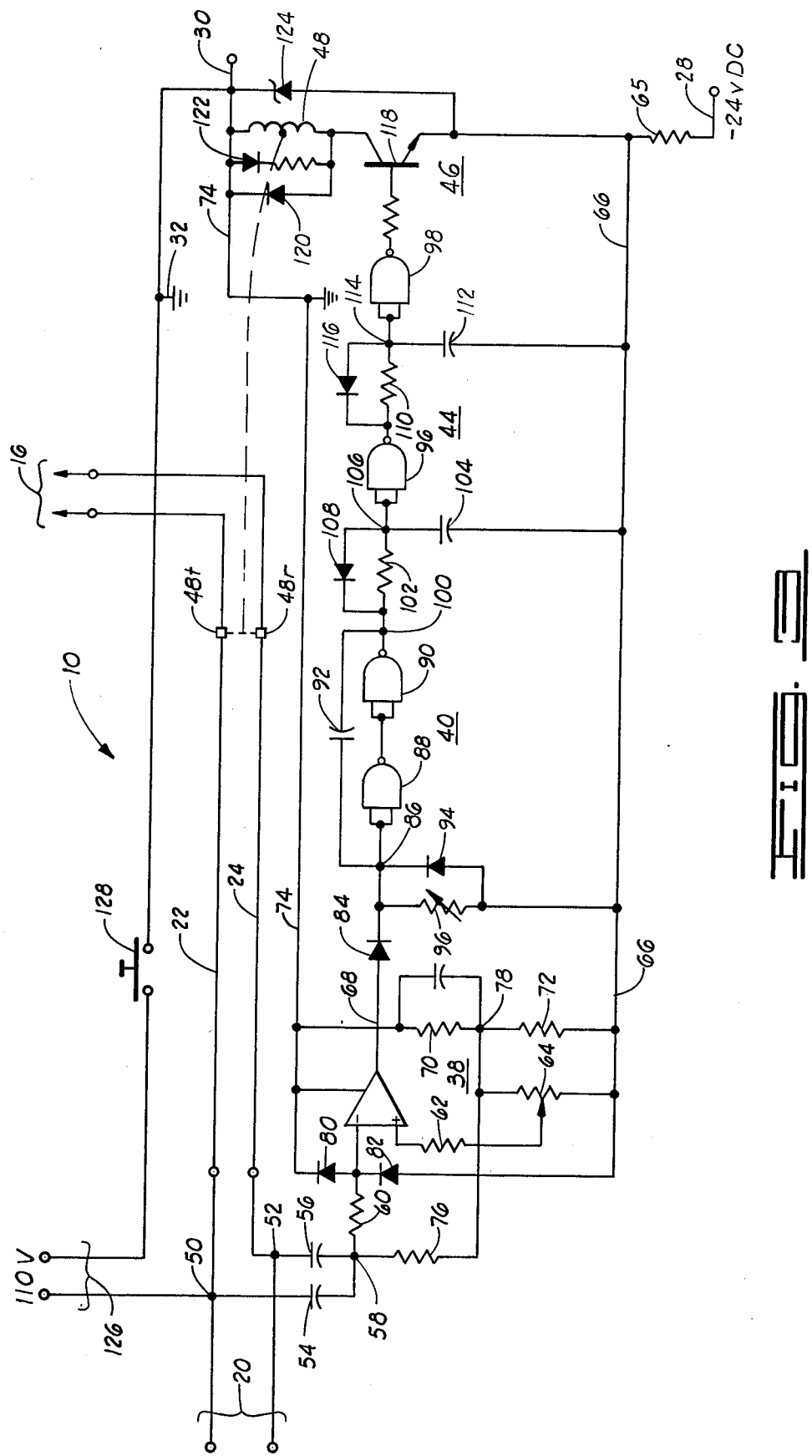
FIG. 3 is a schematic diagram of the protective circuit of FIG. 2.

As shown in FIG. 1, the subject of the invention, a protector circuit 10, is connected in interface between the customer's premises 12 and the external telephone distribution lines or company-owned area 14 that includes a network of distribution lines 16. The customer or user terminal equipment 18 is then connected by line output 20 to protective unit 10, which in turn, is connected to distribution lines 16. The line output 20 and distribution line 16 are a two-wire line carrying the requisite tip and ring signals via individual leads 22 and 24.

The terminal equipment 18, would be a "registered" and/or "grandfathered" equipment in accordance with the definitions set forth by the Federal Communications Commission, and it can only be connected through the external distribution line 16 through some form of protector unit 10. A power source 26 is utilized for energization of protector unit 10 as connected by leads 28 and 30, lead 30 being connected to earth ground as at 32. Power source 26 may be derived from existing premises installation, e.g., a PBX or Key System unit of the registered or grandfathered type that provides the requisite 24 volts D-C for control operation of protector unit 10.

FIG. 2 illustrates the protector unit 10 as operatively connected to the customer premises line output 20 in interface to the external distribution line 16. Line output 20 is sensed by connection at 34 to provide input via line 36 to a square signal generator 38. Output from the square signal generator 38 is then applied to a one shot multivibrator 30 that is frequency responsive from at or near 60 Hz. and above to generate a control signal output on line 42. The control signal is then applied through a series of time delay inverters 44, the number depending upon desired output polarity as will be further described, and the inverter output is then applied to a relay control 46 for actuation of a relay 48. Relay 48 is interconnected to control tip and ring connections 22 and 24 to external distribution line 16, and relay 48 is control actuated to open the line upon sensing of a qualifying hazardous voltage.

As will be further described, the time delay inverters 44 also function with differentiation circuits to provide control response actuation time, as well as control response release time when hazardous voltage is no longer detected on the tip and ring circuits. In one application, relay 48 is normal closed and activated to open connection to external telephone line 16 upon energization in response to conduction of relay control 46; however, the alternative function is equally viable in some applications wherein the relay 48 is normal open and maintained closed by relay energization in response to conduction of relay control 46 during non-presence of hazardous voltage control signal generation.

FIG. 3 illustrates the protector circuit 10 in greater detail. The protector circuit 10 is interconnected between line output 20 and external distribution line 16, i.e., tip and ring connections 22 and 24. Control relay contacts 48t and 48r are interposed in the respective tip and ring connections 22 and 24, and sense outputs are taken from the telephone lines via junction points 50 and 52 with signal applied through respective capacitors 54 and 56 to junction 58 for input to square signal generator 38. The square signal generator 38 may be such as a type 1458 operational amplifier (integrated circuit), and input from junction 58 is applied via resistor 60 to the negative input of the op-amp or square signal generator 38. The positive input of op-amp 38 is biased through a resistor 62 and potentiometer 64 to the negative DC voltage supply lead 66 so that op-amp 38 functions as an overdriven amplifier to provide square wave output on lead 68 at the detected frequency. Input level at junction 58 is further defined by the voltage divider resistor network consisting of resistors 70 and 72 connected in series between negative volts lead 66 and common 74, as parallel resistor 76 is connected between input junction 58 and voltage divider junction 78. The diode 80 is connected between negative op-amp input and common 74, and a diode 82 is connected in like orientation between the negative volts lead 66 and the op-amp input.

Output from the op-amp 38 on lead 68 is then applied through a diode 84 to junction 86 for input to a NAND gate 88 as it functions with NAND gate 90 as the one-shot multivibrator 40. A feedback capacitor 92 functions in coaction with a diode 94 and variable resistor 96 to provide adjustable timing of repetition rate of the one-shot multivibrator 40. The NAND gates 88 and 90 may be two sections of a standard type of quad NAND gate integrated circuit, with gate inverters 96 and 98 utilizing the remainder of such circuit chip.

Output of the one shot multivibrator 40 at junction 100 is then applied to a time delay differentiating circuit consisting of a resistor 102 and capacitor 104 to input junction 106 of inverter NAND gate 96. A discharge release diode 108 is connected in parallel with resistor 102. The RC cicruit, i.e., resistor 102 and capacitor 104, serve to set the actuation response time of protective circuit 10, as will be further described. The output from inverter 96 is then applied to a time delay differentiation circuit consisting of a resistor 110 and capacitor 112 providing input from junction 114 to an inverter 98. A protective discharging diode 116 is connected in parallel with resistor 110, and the RC time set by resistor 110 and capacitor 112 controls the release time of protective circuit 10. That is, the time delay after which telephone distribution line connection will be restored after removal of any hazardous voltage.

Output from inverter 98 is then applied to the base of an NPN transistor 118, i.e., relay control 46, that is connected common emitter to negative volts DC lead 66. The collector of transistor 118 is then connected through control relay 48 to common lead 74 as a protective diode 120 and LED indicating circuit 122 are connected in parallel thereto. A zener diode 124 is connected between common lead 74 and the emitter of transistor 118.

A test circuit is connected between junction 50 at line output 20 and power supply lead 30 as earth grounded at ground point 32. The test circuit consists of a suitable 110 volt source 126 and push button switch 128. An operator or one responsible for checking the circuit can then depress push button switch 128 to place 110 volts hazardous voltage between earth-ground and junction 50 so that protective circuit 10 will operate, as will be evidenced by conduction of transistor 118, actuation of relay 48 to open contacts 48t and 48r, an illumination of LED 122.

In operation, protective circuit 10 senses the line output 20 by means of capacitors 54 and 56 coupled to respective junctions 50 and 52. The capacitors 54 and 56 are each 0.001 microfarads as coupled in series with a 100,000 ohm resistor 76 with junction 58 coupled to the negative input of operational amplifier 38 as the positive input is referenced to a fixed voltage by potentiometer 64 from negative DC volts lead 66. Thus, when instantaneous voltage on the negavtive input is higher (i.e., a normal condition) than the positive input of op-amp 38, the output will be held low on lead 68. When a 60 Hz., 120 volt rms or higher voltage appears on the line output at either junction 50 or 52, i.e., on either side or on both sides relative to ground, an alternating current will appear at junction 58. The alternating current voltage will be reduced by the voltage divider in which the 0.001 microfarad capacitor is the equivalent to approximately 3,000,000 ohms at 60 Hz. thereby making the voltage at junction 58 1/30th what it was when detected at either the tip or ring connector 22 or 24; that is, 150 volts sensed at junctions 50 or 52 will be equal to five volts at the input junction 58 if the frequency is about 60 Hz.

However, if the voltage at junction 50 or 52 was, for example, 150 volts at 20 Hz., the 0.001 microfarad capacitors 54 and 56 would appear as approximately 10,000,000 ohms making the voltage at junction 58 much further reduced or 1/100th that as originally sensed. Thus, it can be seen that there is a first stage of discrimination relative to the 60 cycle or hazardous voltages with which the circuit is concerned. It can then occur that if the reference voltage on the plus terminal of op-amp 38 is above 1.5 volts but below 5 volts, there will be a square signal wave at the output lead 68 for a 60 Hz. signal but nothing for frequencies reduced down toward the 20 Hz. range. However, it is risky to assume that this protection is fool-proof knowing that a sufficiently high ringing voltage, particularly at 30 Hz., may possibly cause an output of control signal on lead 68. Therefore, the output on lead 68 from op-amp 38 is followed with a resettable one-shot multivibrator 40 that is tuned to a time equivalent of slightly longer than one-half of a 60 Hz. wave, but not as long as one-half of a 30 Hz. wave.

The output from one-shot multivibrator 40 as seen at junction 100 is then applied to the resistor 102 and capacitor 104 charging circuit wherein the charging time is made approximately 100 milliseconds. When the output of the one-shot multivibrator 40 is high, the capacitor 104 is charged by resistor 102, and when the output at junction 100 goes low, the diode 108 discharges capacitor 104 instantly. Thus, when a 60 Hz. signal is present as detected, the output of one-shot multivibrator 40 is high at all times, but in the presence of a lower frequency input signal from op-amp 38, the capacitor 104 will be discharged every half cycle thereby to conduct no control signal through inverter 96.

When the output of junction 100 is high for the time constant duration of resistor 102 and capacitor 104, a high is present on the input of inverter 96 causing the low at junction 114 which in turn discharges capacitor 112 to cause an instant high on the output of the final inverter 98. Such high voltage output from inverter 98 then serves to cause conduction of transistor 118 through relay 48 with energization and opening of normally closed contacts 48t and 48r thereby to open the telephone connection to the external distribution line 16. In this manner, any hazardous voltage from the customer premises is removed from external distribution line 16 and such state will remain until the foreign or hazardous voltage is removed from the customer's side of the line. Upon removal of the hazardous voltage from one or both of junctions 50 and 52, the output of inverter 96 will return to its high voltage state; but the RC combination of resistor 110 and capacitor 112 will prevent the output of inverter 98 from returning low for approximately one second, after which the relay 48 will be deenergized to its normal closed position, and phone service continuity will be restored between line output 120 and external distribution line 16.

To summarize, the protective circuit 10 offers two levels or two distinct phases of protective discrimination to aid in disconnecting in the event of hazardous voltage presence. There is a first discrimination of the amplitude as between 60 Hz. voltage and lower frequency voltage due to the fact that the central input capacitors 54 and/or 56 show a much higher reactance to sensed lower frequencies. This might be sufficient under ordinary conditions; however, the circuit must still guard against the extraordinary conditions wherein the magnitude of a sensed 20 or 30 cycle voltage could be so great that signal output would still get through to the square signal generator or op-amp 38. In this event, the resettable one-shot multivibrator 40 is further frequency responsive to the 60 cycle rate so that each time it is triggered it will continue with high output at junction 100 to energize relay control 46 and thereby to actuate relay 48.

If the trigger rate to multivibrator 40 is below approximately 40 Hz., negative spike voltage at junction 100 will keep capacitor 104 discharged such that no control voltage is presented to energize relay control 46. However, if the triggering rate is 60 Hz., there is presented a steady high voltage at junction 100 and, after dual inversion, a high voltage is presented at the base of transistor 118 (relay control 46) to energize the relay 48 thereby to open the phone line. The potentiometer 96 serves to adjust the time constant of the one-shot multivibrator 40 so that it effectively discriminates against all frequencies below approximately 60 cycles, and in usual operation this time constant is adjusted to about 13 milliseconds. As regards further time constants, the recognition or actuation time as set by resistor 102 and capacitor 104 is such that about 5 or 6 cycles of 60 Hz. signal are required before output response to actuate relay control 46; and, the release time set by resistor 110 and capacitor 112 is designed to hold the circuit in actuating condition for one second after removal of connection of any hazardous voltage as sensed at junctions 50 and 52 of line output 20.

The circuit of FIG. 3 illustrates the option wherein the line switching mechanism or relay 48 is normal closed and actuated open upon energization when hazardous voltage is sensed. However, the alternative may well be desirable in some applications and it is completely within the skill of the art to vary the stages as desired. Thus, the circuit may operate with a normal open relay energized closed during normal operation to provide continuity to external telephone distribution lines 16, and the relay may be actuated open by deenergization upon sensing of hazardous voltage. Operating in this mode, the telephone line protection will be present even if protective circuit 10 loses power on power source leads 28 and 30 as derived from the common control equipment on the customer premises. Use of normal open switching action is readily carried out by the addition of another inverter stage prior to control relay 46 thereby to place the proper polarity of voltage in the control function.

FIG. 4 illustrates an alternative form of protective circuit 130 as installed in interface between the customer's installation 132 and the external telephone distribution line 16. The line output from customer installation 132 is sensed by 0.001 microfarad capacitors 54 and 56 with input from junction 58 to a band pass active filter 134 that is tuned to 60 Hz. Filter 134 may be a well-known type of integrated circuit operational amplifier tuned to 60 Hz. with approximately ±10% band width. The output from active filter 134 is then applied to a conventional form of limiter 136 which functions as a squaring device to provide control signal output of sufficient duration through a diode 138 to the base of a control transistor 140. Control transistor 140 may be connected common-emitter with the collector operating through load resistor 142 to a control switch 144 controlling continuity between the telephone line output 20 and the external telephone distribution line 16. The switch 144 may be an electromechanical relay as before described, or it may be a solid state type of relay, for example, an opto-coupler as used with Triac, SCR or transistor control outputs.

FIG. 5 illustrates still another alternative form of protective circuit 150 that may be used to carry out the requisite function. In this circuit, any hazardous voltage at or near 60 Hz. as sensed by capacitors 54 and/or 56 is presented at junction 58 to a limiter 152 which then provides output at controlled amplitude and duration for coupling to a phase locked loop 154. The phase locked loop 154 is sharply tuned to discriminate 60 Hz. signal and upon sensing of hazard voltage signal it produces an output for application to the base of transistor 140 and control of the switch 144 to remove continuity between line output 20 and the external telephone distribution line 16. The phase locked loop 154 may be the conventional form of summing amplifier, filter and voltage controlled oscillator such as the Signetics Type 567 integrated circuit module.

The foregoing discloses a novel protective circuit which can be constructed in highly compact and reliable form to carry out a requisite hazard voltage protective function as now required by the Federal Communications Commission on certain new installations of customer telephone equipment. The protective circuit, or its several equivalents, offers a dual mode recognition and response function that enables a total protective function for its intended use, and the circuit stability and reliability of the protective unit are enhanced by the relatively simple form of circuit structure utilized. It should also be understood that while particular circuit stages are specified in relation to the preferred embodiment, there are obvious equivalents which are well known to the skilled artisan and may be substituted in selected stages of the circuit.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A hazardous voltage isolation and protection device for interconnection between a telephone installation line output and the external telephone distribution line, comprising:
    discrimination means connected to said line output and providing a control signal output upon detection of approximately sixty cycle per second voltage on said line output;
    switching means connected in series with said external telephone distribution line; and
    reactance means responsive to input of said control signal to actuate said switching means and disconnect said external telephone distribution line.

2. A protection device as set forth in claim 1 wherein said discrimination means comprises:
    high pass means receiving input from said line output to provide a selected signal output with maximum amplitude at sixty cycles per second and above; and
    circuit means receiving input of said selected signal output to generate said control signal when the selected signal output amplitude exceeds a selected amount.

3. A protection device as set forth in claim 1 wherein: said switching means is normally closed and actuated open by said reactance means.

4. A protection device as set forth in claim 1 wherein: said switching means is normally open but maintained closed until actuated open by said reactance means.

5. A protection device as set forth in claim 1 wherein said discrimination means comprises:
    high pass means connected to said line output and providing a selected signal output;
    square signal amplifier means receiving said selected signal to provide a square signal output at the frequency of said selected signal; and
    one-shot multivibrator means triggered by the square signal to provide said control signal output.

6. A protection device as set forth in claim 1 wherein said discrimination means comprises:
    active filter means connected to said line output to provide a band width selected signal output; and
    limiter means receiving said selected signal to provide control signal output greater than a predetermined amplitude.

7. A protection device as set forth in claim 1 wherein said discrimination means comprises:
    high pass means connected to said line output and providing a selected signal output;
    limiter means receiving said selected signal to provide a fixed amplitude signal; and
    phase locked loop means receiving said fixed amplitude signal to generate said control signal.

8. A protection device as set forth in claim 5 which is further characterized to include:
    differentiating means receiving said control signal output to control the actuation response time of said switching means relative to the sixty cycle per second frequency.

9. A protection device as set forth in claim 5 which is further characterized to include:
    time delay differentiating means receiving said control signal output to control the actuation release time of said switching means after cessation of selected signal output from said high pass means.

10. A protection device as set forth in claim 8 which is further characterized to include:
    first inverter means receiving control signal output from said differentiating means; and
    time delay differentiating means receiving control signal output from said first inverter means to control the actuation release time of said switching means after cessation of selected signal output from said high pass means.

11. A protection device as set forth in claim 3 wherein:
    said reactance means is a transistor that is normally cut off and conductive in response to input of said control signal.

12. A protection device as set forth in claim 4 wherein:
    said reactance means is a transistor that is normally conductive and cut off in response to input of said control signal.

13. A method for preventing the presence on telephone transmission lines of hazardous voltages originating at or near a private telephone installation having a line interconnection to said transmission line, comprising the steps of:
    sensing voltage at the interconnection to said transmission lines;
    detecting any voltages approximately sixty cycles per second from said sensed voltage; and
    opening said interconnection whenever such voltages approximately sixty cycles per second are detected.

14. A method as set forth in claim 13 wherein said step of detecting comprises:
    filtering the sensed voltage to pass frequencies greater than approximately fifty-five cycles per second as a first signal output; and
    receiving and processing said first signal output to further define said voltages approximately sixty cycles per second.

* * * * *